A. G. FEISTEL.
VEHICLE LOCK.
APPLICATION FILED OCT. 15, 1908.
918,741.
Patented Apr. 20, 1909.
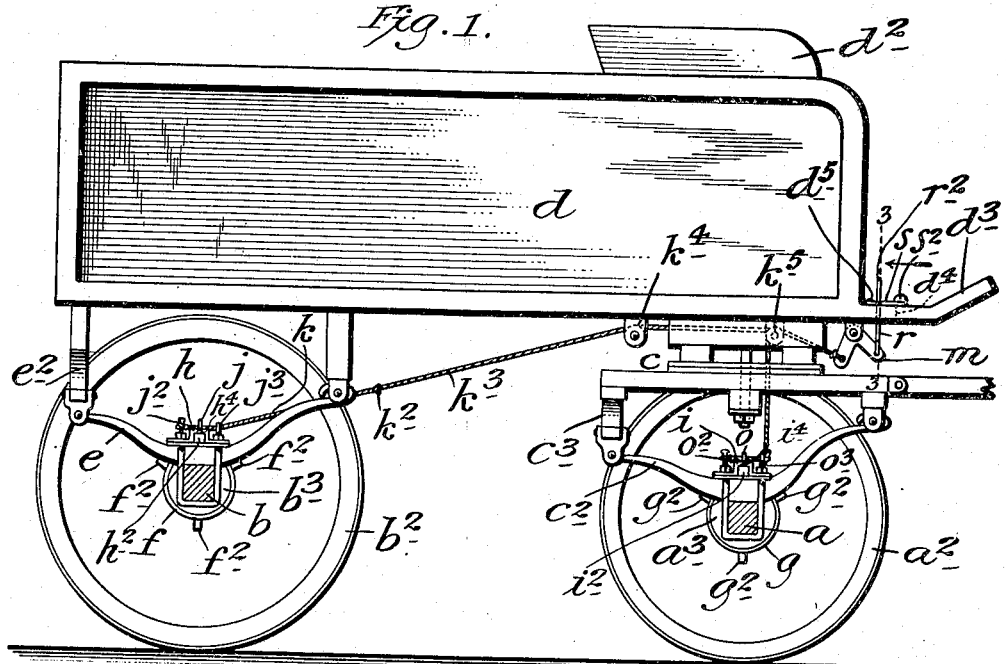
Fig. 1.
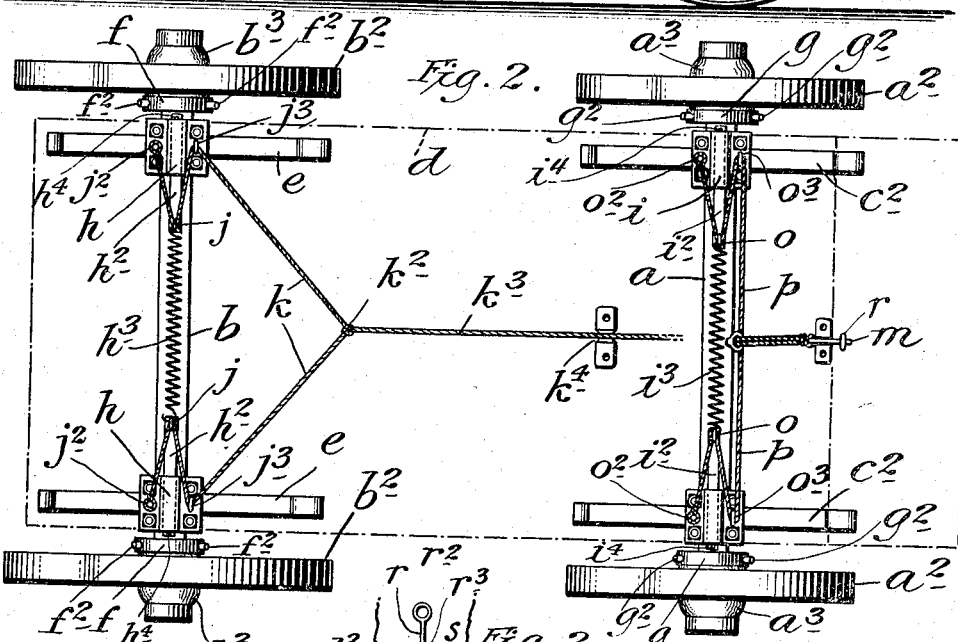
Fig. 2.
Fig. 3.
WITNESSES
INVENTOR.
August G. Feistel.
BY
ATTORNEYS.

UNITED STATES PATENT OFFICE.

AUGUST G. FEISTEL, OF NEW YORK, N. Y., ASSIGNOR OF ONE-HALF TO OBED TRILL, OF WOODHAVEN, NEW YORK.

VEHICLE-LOCK.

No. 918,741.      Specification of Letters Patent.      Patented April 20, 1909.

Application filed October 15, 1908. Serial No. 457,794.

*To all whom it may concern:*

Be it known that I, AUGUST G. FEISTEL, a citizen of the United States, and residing at New York, in the county of New York and State of New York, have invented certain new and useful Improvements in Vehicle-Locks, of which the following is a specification, such as will enable those skilled in the art to which it appertains to make and use the same.

This invention relates to vehicle locks and particularly to devices of this class designed to prevent a horse or horses from running when hitched to the vehicle; and the object thereof is to provide an improved device or devices of this class which may be operated by the driver of the vehicle whenever necessary, and by means of which all the wheels of the vehicle may be instantly locked whenever desired; and with this and other objects in view the invention consists in a device or devices of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of an ordinary express wagon provided with my improvement and partly in section, Fig. 2 a plan view of the running gear with the bed or body removed, and;—Fig. 3 a sectional detail of the means for operating the locking device or devices.

In the drawing forming part of this specification, I have shown an ordinary express wagon, the running gear of which comprises the usual front and rear axles $a$ and $b$, the front wheels $a^2$, rear wheels $b^2$, the fifth wheel construction $c$ and body $d$, the fifth wheel construction $c$ being supported by the usual springs $c^2$ and $c^3$ and the body $d$ being supported on the fifth wheel construction and on the rear axle by means of springs $e$ and $e^2$, all these parts being of the usual or any preferred construction and forming no part of this invention.

The hubs $b^3$ of the rear wheels $b^2$ are provided at their inner ends with bands $f$ having radial pins or projections $f^2$ any desired number of which may be employed, and the hubs $a^3$ of the front wheels $a^2$ are provided with similar bands $g$ having radial pins or projections $g^2$ any desired number of which may be employed.

Mounted on and secured to the opposite end portions of the rear axle $b$ inwardly of the wheels $b^2$ are housings $h$ in which are mounted longitudinally movable bolts $h^2$ connected by a contractile spring $h^3$, and mounted on and secured to the opposite end portions of the front axle $a$ inwardly of the wheels $a^2$ are housings $i$ in which are mounted longitudinally movable bolts $i^2$ connected by a contractile spring $i^3$, and the housings $i$, bolts $i^2$ and springs $i^3$ are similar in all respects to the corresponding housings $h$, bolts $h^2$ and spring $h^3$ on or over the rear axle. The bolts $h^2$ and $i^2$ are provided at their outer ends with stops $h^4$ and $i^4$ to limit their inward movement.

The bolts $h^2$ are provided at their inner ends with suitable keepers $j$, and secured at the rear sides of the housings $h$ as shown at $j^2$ are wire cables or other flexible cords $k$ which are passed through the keepers $j$ and through other keepers $j^3$ secured forwardly of the housings $h$, and the cables or cords $k$ are connected at $k^2$ with a similar cable or cord $k^3$ which is carried forwardly centrally and longitudinally of the running gear and passed over pulleys or keepers $k^4$ and $k^5$ over the fifth wheel construction $c$, and supported beneath the front end of the body of the vehicle is a bell crank $m$ with the rear arm of which the cable or cord $k^3$ is connected.

The bolts $i^2$ are provided at their inner ends with keepers $o$, and secured rearwardly of the housings $i$ in which the bolts $i^2$ are placed and as shown at $o^2$ are wire cords or cables $p$ which are passed through the keepers $o$ and through other keepers $o^3$ at the front of the housings $i$, and said cables or cords $p$ are then passed through a keeper $o^4$ midway of the front axle $a$, from which they are passed over through or around the keeper $k^5$ and also connected with the rear arm of the bell crank $m$.

The body $d$ of the vehicle, in the construction shown, is provided with a front seat $d^2$ and with a forwardly directed foot support $d^3$, and connected with the front arm of the bell crank $m$ is a rod $r$ which passes upwardly through the foot support $d^3$ or through an enlarged opening $d^4$ formed therein, and said rod is provided at its upper end with a handle, ring or similar device $r^2$, and at one side thereof with a tooth or projection $r^3$ and pivoted to the foot support $d^3$ at $d^5$ is a catch plate $s$ provided at its free end with a raised lip or projection $s^2$, and the catch plate $s$ is adapted to be moved under the tooth or projection $r^3$ on the rod $r$ when said rod is raised as shown in Fig. 3 and to hold said rod in its raised position, in which position the locking bolts $h^2$ and $i^2$ are thrown outwardly so as to engage the pins or projections $f^2$ and $g^2$ on the hubs of the rear wheels $b^2$ and front wheels $a^2$.

The normal position of the parts is that shown in Fig. 2, and in this position the locking bolts $h^2$ and $i^2$ are drawn inwardly by the springs $h^3$ and $i^3$, and in this position of said parts the bolt $r^3$ is in the position shown in Fig. 1. If, at any time, the driver or operator of the vehicle desires to lock the wheels, all that is necessary is to pull upwardly on the rod $r$. This operation projects the bolts $h^2$ and $i^2$ against the operation of the springs $h^3$ and $i^3$ so that said bolts will engage the pins $f^2$ and $g^2$ on the hubs of the rear and front wheels, and at this time the catch plate $s$ is moved into the position shown in Fig. 3 and the bolt $r$ is retained in its raised position and the wheels of the vehicle will be securely locked, and all that is necessary in order to unlock said wheels is to move the catch plate $s$ out of engagement with the bolt $r$.

With my improvement applied to a vehicle of the class shown and described it will be apparent that the front axle may be turned at right angles to the rear axle of the vehicle without interfering with the locking device or devices, or the operation thereof, and by reason of this fact my improvement as shown and described is particularly applicable to express and delivery wagons in large cities and towns; but it will also be apparent that my improvement may be applied to other kinds and classes of vehicles, and various changes in and modifications of the construction shown and described may be made, within the scope of the appended claims, without departing from the spirit of my invention or sacrificing its advantages.

Having fully described my invention, what I claim as new and desire to secure by Letters Patent, is:—

1. The herein described means for locking wheels of a vehicle comprising bolts arranged over the opposite end portions of an axle and movable longitudinally thereof and adapted to engage the hubs of the wheels on said axle, a tensional device connecting the bolts over the axle and adapted to draw them inwardly out of engagement with the hubs of the wheels, flexible devices connected with the inner ends of said bolts and passed around pulleys supported at the ends of the axle and connected with a supplemental flexible device under the control of the operator of the vehicle, whereby a pull on said supplemental flexible device will project said bolts and cause them to engage the hubs of the wheels.

2. The herein described means for locking the wheels of a vehicle comprising bolts arranged over the opposite end portions of the axles and movable longitudinally thereof and adapted to engage the hubs of the wheels, tensional devices connecting the bolts over the axle and adapted to draw them inwardly out of engagement with the hubs of the wheels, and flexible devices connected with the inner ends of said bolts and passed around pulleys at the ends of the axles and under the control of the operator of the vehicle for forcing said bolts outwardly and causing them to engage the hubs of the wheels.

In testimony that I claim the foregoing as my invention I have signed my name in presence of the subscribing witnesses this 14th day of October, 1908.

AUGUST G. FEISTEL.

Witnesses:
A. R. APPLEMAN,
C. E. MULREANY.